US008649737B2

(12) United States Patent
Kihara et al.

(10) Patent No.: US 8,649,737 B2
(45) Date of Patent: Feb. 11, 2014

(54) MOBILE COMMUNICATION TERMINAL TEST SYSTEM, ANALYSIS METHOD, AND ANALYSIS PROGRAM

(75) Inventors: Yoshitaka Kihara, Atsugi (JP); Micael-Lacson Magpayo, Atsugi (JP); Naofumi Naruse, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 162 days.

(21) Appl. No.: 13/408,123

(22) Filed: Feb. 29, 2012

(65) Prior Publication Data
US 2012/0252372 A1 Oct. 4, 2012

(30) Foreign Application Priority Data

Mar. 30, 2011 (JP) ................................ 2011-074312

(51) Int. Cl.
*H04B 17/00* (2006.01)
(52) U.S. Cl.
USPC ............... 455/67.14; 455/423; 455/67.11; 455/424; 455/550.1; 455/226.1; 379/27.01; 375/224
(58) Field of Classification Search
USPC ............ 455/67.14, 67.11, 423, 424, 550.1, 455/226.1, 67.7
See application file for complete search history.

(56) References Cited

U.S. PATENT DOCUMENTS

| | | | | |
|---|---|---|---|---|
| 5,590,275 | A * | 12/1996 | Van Berkel et al. | 714/30 |
| 5,889,837 | A * | 3/1999 | Sands | 379/27.06 |
| 5,917,831 | A * | 6/1999 | Katker et al. | 714/712 |
| 6,023,203 | A * | 2/2000 | Parish | 333/126 |
| 8,335,339 | B2 * | 12/2012 | Tagami et al. | 381/413 |
| 8,437,385 | B1 * | 5/2013 | Dark | 375/224 |
| 8,442,150 | B1 * | 5/2013 | Dark et al. | 375/296 |

FOREIGN PATENT DOCUMENTS

JP 10221387 A 8/1998

* cited by examiner

*Primary Examiner* — Marceau Milord
(74) *Attorney, Agent, or Firm* — Pearne & Gordon LLP

(57) ABSTRACT

To enable addition or changes of functions with changes of communication standards in a mobile communication terminal test system. A mobile communication terminal test system includes a transceiver which has a control unit configured to append input information to acquired waveform data, a signal analysis unit which executes an analysis program, and a signal analyzer which is provided separately from the transceiver. The analysis program has a processing program which is provided for each type of arithmetic processing on the waveform data, a control program which is provided for each communication system, selects one or more processing programs for each test item, and executes the processing programs, and a switching program which specifies a communication system and a test item on the basis of the input information, and selects and executes a control program.

4 Claims, 5 Drawing Sheets

MOBILE COMMUNICATION TERMINAL TEST SYSTEM, ANALYSIS METHOD, AND ANALYSIS PROGRAM

TECHNICAL FIELD

The present invention relates to a technique for a mobile communication terminal test system, and to a technique for analyzing a signal under test transmitted from a mobile communication terminal, such as a mobile phone.

BACKGROUND ART

As one wireless communication system in a third-generation mobile communication system, W-CDMA (Wideband Code Division Multiple Access) has been standardized. HSDPA (High Speed Downlink Packet Access) of a 3.5-generation mobile communication system (3.5G) which has improved a data communication rate for a downlink based on W-CDMA has been standardized. In regard to HSDPA, a communication system of HSUPA (High Speed Uplink Packet Access) which has improved a data communication rate for an uplink has been standardized. Mobile communication terminals, such as mobile phones, need to be compliant with these standards. In order to verify compliance with these standards, a mobile communication terminal test system is provided.

As a next-generation communication standard of W-CDMA, a mobile communication standard, called LTE (Long Term Evolution), has been designed. With the advancement of a technique for mobile communication, various communication systems have been newly standardized. It is necessary for a mobile communication terminal test system to support the new communication systems.

The mobile communication terminal test system has a signal transmission unit which transmits a signal to the mobile communication terminal, a signal reception unit which receives a signal from the mobile communication terminal, and a base station simulator which operates as a pseudo base station. The base station simulator transmits and receives a signal with respect to the mobile communication terminal, and analyzes waveform data of the signal received from the mobile communication terminal to test the mobile communication terminal. The types of the test are diverse, and the number of items extends to several hundred. The type or items of the test are defined for each communication system standard, causing an increase in the test items with addition or changes of the standards. For this reason, an increase in the test time leads to an increase in cost, and in the base station simulator, the reduction in the test time is a problem in the related art.

In the mobile communication terminal test system of the related art, waveform data is analyzed by a signal analysis unit in the base station simulator. For this reason, in order to support a new communication standard, it is necessary to substitute a program embedded in the signal analysis unit with a program corresponding to the new communication standard.

In recent years, the improvement in the performance of a PC (Personal Computer) has been remarkable, and the introduction of a signal analyzer having a higher-performance PC than the base station simulator is done at lower cost than the introduction of a new base station simulator. For this reason, waveform data is analyzed by the signal analyzer, such that a reduction in the test time is anticipated. However, in the mobile communication terminal test system of the related art, since the signal analysis unit is embedded in the base station simulator, it is difficult for the signal analyzer provided outside the base station simulator to analyze.

RELATED ART DOCUMENT

Patent Document

[Patent Document 1] JP-A-10-221387

SUMMARY OF THE INVENTION

Problem that the Invention is to Solve

An object of the invention is to make it easy to add or change functions with changes of communication standards in the mobile communication terminal test system.

Means for Solving the Problem

In order to achieve the above-described object, a first aspect of the invention provides a mobile communication terminal test system. The mobile communication terminal test system includes a transceiver (1), including a measurement unit (12) which transmits and receives a signal with respect to a terminal (2) under test and acquires waveform data of a received signal, and a control unit (11) which controls the measurement unit in accordance with a designated communication system and a test item, and appends input information for identifying the communication system and the test item to the waveform data, and a signal analyzer (3) which includes a signal analysis unit (32) configured to analyze the waveform data received from the transceiver, and is provided separately from the transceiver. The signal analysis unit has arithmetic processing units (P31 to P34) which are provided for the respective types of arithmetic processings so as to perform a plurality of types of arithmetic processings on the waveform data, control processing units (P21 to P24) which are provided for the respective communication systems, select one or more arithmetic processing units so as to output desired analysis data for each test item, and allow the arithmetic processing units to perform the arithmetic processings in association as a set of processes in a predetermined sequence, and a switching unit (P10) which specifies the communication system and the test item on the basis of the input information appended to the waveform data, and selects a control processing unit in accordance with the specified communication system and the specified test item. The control processing unit is selected by the switching unit in accordance with the specified communication system, and when the control processing unit is selected, the arithmetic processing unit performs the processes in accordance with the specified test item.

According to a second aspect of the invention, in the mobile communication terminal test system according to the first aspect of the invention, the signal analysis unit may be configured so that one or both of the arithmetic processing units and the control processing units can be added or deleted.

A third aspect of the invention provides a method of analyzing waveform data by a transceiver (1) and a signal analyzer (3). The transceiver (1) includes a measurement unit (12) which transmits and receives a signal with respect to a terminal (2) under test and acquires waveform data of a received signal, and a control unit (11) which controls the measurement unit in accordance with a designated communication system and a test item, and appends input information for identifying the communication system and the test item to the waveform data. The signal analyzer (3) includes a signal analysis unit (32) which executes an analysis program (P1) for analyzing the waveform data to analyze the waveform data received from the transceiver. The method includes a preparation step of preparing, as the analysis program, processing programs (P31 to P34) which are provided for respective types of arithmetic processings so as to perform a plurality of types of arithmetic processings on the waveform data, control programs (P21 to P24) which are provided for respective communication systems, select a processing program, which performs one or more arithmetic processings so as to output desired analysis data for each test item, and allow the processing program to perform the arithmetic processings in association as a set of processes in a predetermined sequence, and a switching program (P10) which specifies the communication system and the test item on the basis of the input information appended to the waveform data, a condition specification step of specifying the communication system and the test item on the basis of the input information appended to the waveform data, a switching step of causing a control program corresponding to the specified communication system to be executed in accordance with the communication system, and an arithmetic execution step in which a control program is selected for each step of each arithmetic processing associated with the specified test item and the arithmetic processing is performed.

A fourth aspect of the invention provides an analysis program (P1) which causes a computer to analyze waveform data measured through transmission/reception of a signal with respect to a terminal under test (2) and appended with input information for identifying a designated communication system and a test item. The analysis program has processing functions (P31 to P34) for respective types of arithmetic processings so as to perform a plurality of types of arithmetic processings on the waveform data, control functions (P21 to P24) which are provided for respective communication systems, and execute one or more processing functions in association as a set of processes in a predetermined sequence so as to output desired analysis data for each test item, and a specification function (P10) which specifies the communication system and the test item on the basis of the input information appended to the waveform data, and executes the control function in accordance with the specified communication system. When the control function is executed, the processing function is executed in accordance with the specified test item.

Advantage of the Invention

In the mobile communication terminal test system according to the invention, a process for analyzing the waveform data can be performed by the signal analyzer which is provided separately from the transceiver. Therefore, even when a new test item is added, it becomes possible to substitute a program for the signal analyzer without substituting the transceiver. The control programs are provided for the respective communication systems to constitute the analysis program. For this reason, the control programs are added or changed, thereby making it easy to add or change functions with changes of communication standards.

MODE FOR CARRYING OUT THE INVENTION

Figure 1:
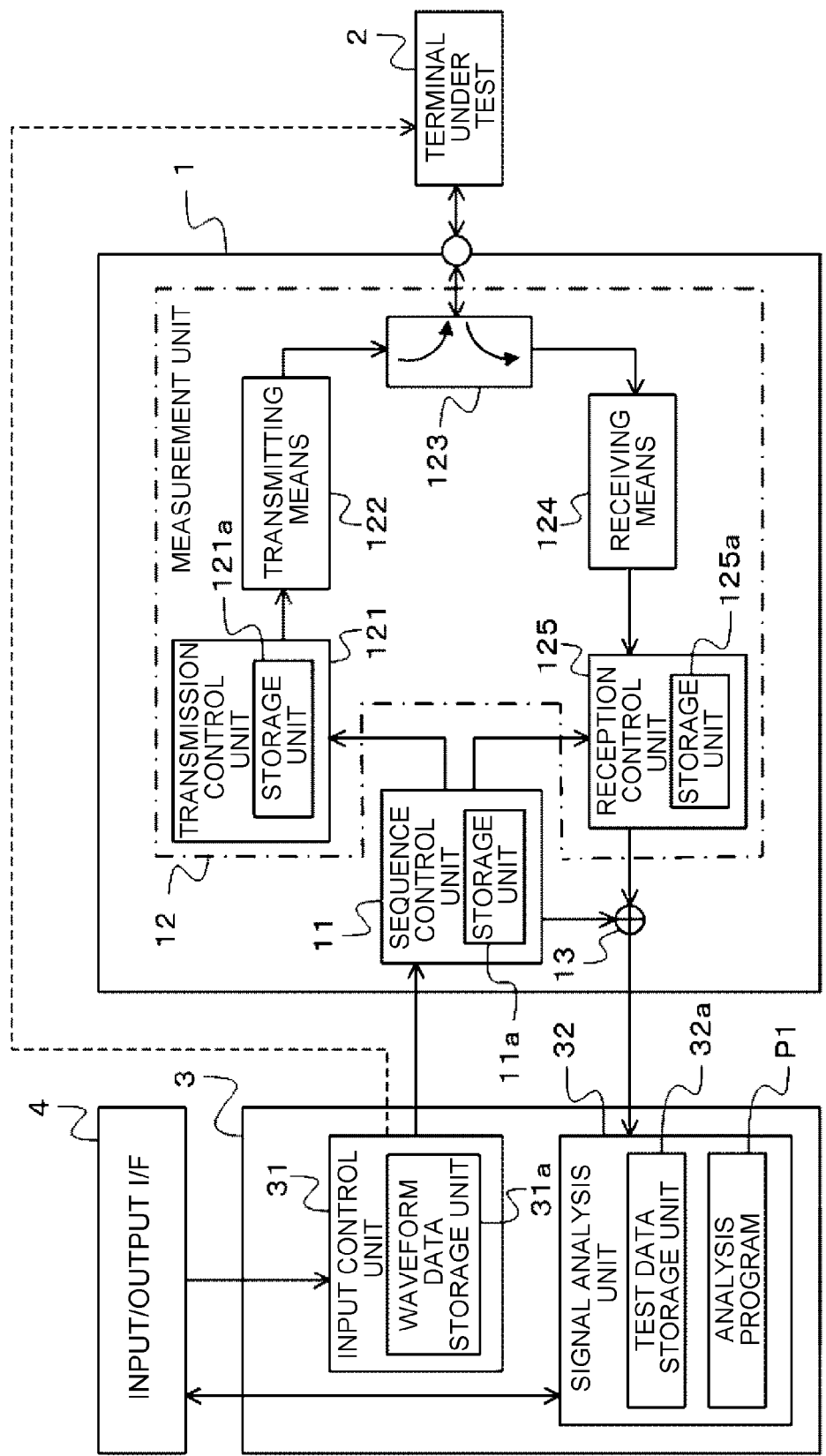
FIG. 1 is a block diagram of a mobile communication terminal test system according to the invention.

A mobile communication terminal test system according to the invention will be described with reference to FIG. 1. As shown in FIG. 1, the mobile communication terminal test system includes a transceiver 1, a signal analyzer 3, and an input/output I/F 4. The transceiver 1 includes a sequence control unit (control unit) 11, a measurement unit 12, and a combiner 13. The measurement unit 12 includes a transmission control unit 121, transmitting means 122, a directional coupler 123, receiving means 124, and a reception control unit 125. The signal analyzer 3 includes a computer (PC or the like) together with the input/output I/F 4, and functionally includes an input control unit 31 and a signal analysis unit 32.

In the mobile communication terminal test system according to the invention, a test signal is transmitted from the transceiver 1 to the terminal 2 under test, and waveform data of a signal under test which returns from the terminal 2 under test to the transceiver 1 is analyzed by the signal analyzer 3 in accordance with a test item defined in advance. The transceiver 1 may be operated as a base station simulator or may not be operated as a base station simulator. In the configuration in which the transceiver 1 is not operated as a base station simulator, as indicated by a dotted line of FIG. 1, the terminal 2 under test is connected to the signal analyzer 3 through an I/F, such as a USB. The input control unit 31 synchronously controls the transceiver 1 and the terminal 2 under test, and a test is carried out. In this case, a test is carried out in a state where the transceiver 1 and the terminal 2 under test are not in call connection. When the transceiver 1 is operated as a base station simulator, a test is carried out in a state where the transceiver 1 and the terminal 2 under test are in call connection. Hereinafter, in regard to the configuration of the mobile communication terminal test system of this embodiment, for example, the configuration in which the transceiver 1 is operated as a base station simulator will be described separately divided into sections "configuration when transmission", "configuration when reception", and "configuration when analysis". The "configuration when transmission" shows a configuration in which an operation is performed when a test signal is transmitted from the transceiver 1 to the terminal 2 under test. The "configuration when reception" shows a configuration in which an operation is performed when a signal under test which returns from the terminal 2 under test is received by the transceiver 1. The "configuration when analysis" shows a configuration in which an operation is performed when waveform data of a signal under test received by the transceiver 1 is analyzed by the signal analyzer 3.

(Configuration when Transmission)

First, a configuration in which an operation is performed when a test signal is transmitted from the transceiver 1 to the terminal 2 under test on the basis of the conditions designated by an operator will be described.

The input/output I/F 4 is an interface which is configured to designate input information. The input information stores communication systems to be used, test items to be carried out, and parameters when each test is carried out. The parameters include the conditions when a test signal is transmitted from the measurement unit 12 to the terminal 2 under test or the conditions when a signal under test transmitted from the terminal 2 under test is received by the measurement unit 12. As a specific example, the frequency of a signal (UL: Uplink, DL: Downlink) to be transmitted/received, the input/output level of the signal, and the like are included. The input/output I/F 4 transmits the input information designated by the operator to the input control unit 31. The input/output I/F 4 corresponds to, for example, an input terminal, a user program created by the operator, or the like.

Figure 2:
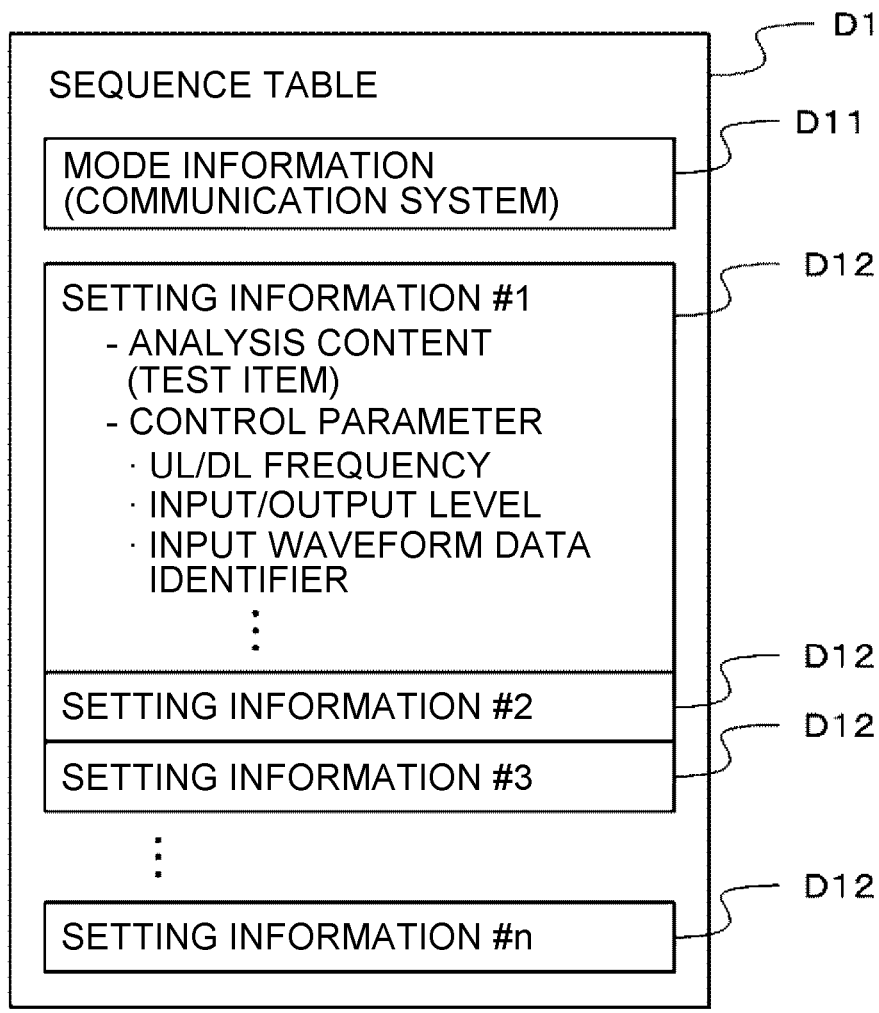
FIG. 2 is an example of the data structure of a sequence table.

The input control unit 31 creates a sequence table D1 on the basis of the input information received from the input/output I/F 4. FIG. 2 shows an example of the data structure of the sequence table D1. As shown in FIG. 2, the sequence table D1 includes mode information D11 and one or more pieces of setting information D12. In the mode information D11, information representing a communication system designated as the input information is input. The setting information D12 is generated for each test item to be carried out. That is, when n test items are carried out, n pieces (#1 to #n) of setting information D12 are generated. In the setting information D12, information representing a test item and information representing parameters designated as the conditions of a test represented by the test item are input.

On the basis of predetermined test conditions, the preset of the setting information D12 in which parameters based on the conditions are input may be generated and stored. With this configuration, it becomes possible to simplify the input of the fine test conditions. A plurality of presets may be associated in advance. For example, when a plurality of presets are associated with test classifications, a test classification is selected, making it possible to simultaneously select a plurality of test items associated with the test classification. The present of the setting information D12 may be associated with predetermined mode information D11, and the presets of the sequence table D1 may be generated and stored in advance. With this configuration, it becomes possible to simultaneously select a set of test items in accordance with a communication system defined in advance with a simple operation.

The input control unit 31 includes a waveform data storage unit 31a, and stores waveform data (hereinafter, called "transmission waveform data") for generating a baseband signal in accordance with the test conditions in the waveform data storage unit 31a. A test signal (that is, an RF signal on the DL side) output to the terminal 2 under test is generated by modulating the baseband signal generated on the basis of transmission waveform data. The input control unit 31 specifies corresponding transmission waveform data on the basis of the conditions of a test signal designated for each test item as the input information, and reads transmission waveform data from the waveform data storage unit 31a. The input control unit 31 inputs identification information for specifying read transmission waveform data to the setting information D12 of a test item associated with waveform data. The input control unit 31 may be configured to generate transmission waveform data on the basis of the conditions of a test signal designated as the input information.

The input control unit 31 transmits the generated sequence table D1 to the sequence control unit 11 in association with one or more pieces of transmission waveform data read in response to the designated test item. Thereafter, when an instruction to start a test is issued from the input/output I/F 4, the input control unit 31 gives notification of the instruction to the sequence control unit 11. When receiving the notification, the sequence control unit 11 starts a test.

The sequence control unit 11 includes a storage unit 11a, and when receiving the sequence table D1 and one or more pieces of transmission waveform data from the input control unit 31, stores these pieces of data in the storage unit 11a. Thereafter, the sequence control unit 11 is given notification of the start of the test from the input control unit 31. In this way, before the test starts, the sequence table D1 and transmission waveform data are transmitted to the sequence control unit 11 in advance, making it possible to prevent an increase in a test time due to data transmission and reception.

When the notification of the instruction to start a test is given, the sequence control unit 11 reads the mode information D11 from the sequence table D1 stored in the storage unit 11a, and outputs the read mode information D11 to the transmission control unit 121 and the reception control unit 125. The transmission control unit 121 and the reception control unit 125 will be described below. In this way, it becomes possible for the measurement unit 12 to recognize a communication system designated as the input information and to transmit and receive a signal with respect to the terminal 2 under test on the basis of the communication system.

Next, the sequence control unit 11 reads the setting information D12 from the sequence table D1 stored in the storage unit 11a, and extracts the identification information of transmission waveform data from the read setting information D12. The sequence control unit 11 specifies transmission waveform data corresponding to a test item represented by the setting information D12 from among one or more pieces of transmission waveform data stored in the storage unit 11a on the basis of the extracted identification information. The sequence control unit 11 outputs specified transmission waveform data to the transmission control unit 121.

The sequence control unit 11 extracts parameters designated as the test conditions from the setting information D12, and outputs a parameter relating to transmission of the test signal (the RF signal on the DL side) from among the parameters to the transmission control unit 121. The sequence control unit 11 outputs a parameter relating to reception of the signal under test (the RF signal on the UL side) from among the extracted parameters to the reception control unit 125. When the output of the parameters to the transmission control unit 121 and the reception control unit 125 is completed, the sequence control unit 11 issues an instruction to start a test to the transmission control unit 121 and the reception control unit 125. Thus, a test corresponding to the read setting information D12 is carried out. In other words, the test signal is transmitted from the transmitting means 122 to the terminal 2 under test on the basis of the conditions corresponding to a test item, and the signal under test which returns from the terminal 2 under test is received by the receiving means 124. The operation at this time, that is, the operations of the transmitting means 122 and the receiving means 124 will be described below.

The sequence control unit 11 reads the setting information D12 from the sequence table D1 and then sequentially performs a set of processes for carrying out a test corresponding to the setting information D12 for each piece of setting information D12 (#1 to #n) in the sequence table D1.

The transmission control unit 121 controls the operation of the transmitting means 122. The transmitting means 122 has a configuration for transmitting the test signal to the terminal 2 under test. The details of the transmitting means 122 will be described below. When receiving the mode information D11 from the sequence control unit 11, thereafter, the transmission control unit 121 controls the operation of the transmitting means 122 on the basis of the mode information D11. Thus, the transmitting means 122 operates on the basis of a communication system designated by the mode information D11.

The transmission control unit 121 includes a storage unit 121a, and when receiving transmission waveform data from the sequence control unit 11, stores transmission waveform data in the storage unit 121a. The transmission control unit 121 receives the parameter relating to the transmission of the test signal (DL) from the sequence control unit 11, and generates control information for controlling the operation of the transmitting means 122 on the basis of the parameter. The control information includes, for example, information representing the frequency or output level of the test signal.

When an instruction to start a test is issued from the sequence control unit 11, the transmission control unit 121 outputs the generated control information and transmission waveform data stored in the storage unit 121a to the transmitting means 122, and causes the transmitting means 122 to generate the test signal.

The reception control unit 125 controls the operation of the receiving means 124. The receiving means 124 has a configuration for receiving the signal under test which returns from the terminal 2 under test. The details of the receiving means 124 will be described in the section "configuration when reception". When receiving the mode information D11 from the sequence control unit 11, thereafter, the reception control unit 125 controls the operation of the receiving means 124 on the basis of the mode information D11. Thus, the receiving means 124 operates on the basis of a communication system designated by the mode information D11.

The reception control unit 125 receives the parameter relating to the reception of the signal under test (the RF signal on the UL side) from the sequence control unit 11, and generates control information for controlling the operation of the receiving means 124 on the basis of the parameter. The control information includes, for example, information representing the frequency or input level of the signal under test.

When an instruction to start a test is issued from the sequence control unit 11, the reception control unit 125 outputs the generated control information to the receiving means 124. In this way, it becomes possible for the receiving means 124 to receive the signal under test from the terminal 2 under test on the basis of the control information.

When receiving the mode information D11 from the transmission control unit 121, thereafter, the transmitting means 122 operates on the basis of a communication system designated by the mode information D11. The transmitting means 122 receives the control information and transmission waveform data from the transmission control unit 121. The transmitting means 122 generates a baseband signal on the basis of transmission waveform data, and modulates the generated baseband signal on the basis of the control information and the communication system designated by the mode information D11 to generate the test signal (the RF signal on the DL side). The transmitting means 122 transmits the generated test signal to the terminal 2 under test through the directional coupler 123.

The directional coupler 123 sends the test signal from the transmitting means 122 to the terminal 2 under test. The directional coupler 123 sends the signal under test transmitted from the terminal 2 under test to the receiving means 124.

Although in the above description, the configuration has been described in which the input control unit 31 generates the sequence table D1, instead of the input control unit 31, the sequence control unit 11 may generate the sequence table D1. In this case, the waveform data storage unit 31a may be provided in the sequence control unit 11.

(Configuration when Reception)

Next, a configuration in which an operation is performed when a signal under test which returns from the terminal 2 under test is received by the transceiver 1 will be described.

When receiving the mode information D11 from the reception control unit 125, thereafter, the receiving means 124 operates on the basis of a communication system designated by the mode information D11. The receiving means 124 receives the control information from the reception control unit 125 and then receives the signal under test from the terminal 2 under test through the directional coupler 123. The receiving means 124 demodulates the received signal under test to a baseband signal on the basis of the control information and the communication system designated by the mode information D11. The receiving means 124 outputs the demodulated baseband signal to the reception control unit 125.

The reception control unit 125 receives the baseband signal demodulated from the signal under test from the receiving means 124. The reception control unit 125 includes a storage unit 125a, generates waveform data (hereinafter, called "reception waveform data") of the baseband signal received from the receiving means 124, and stores generated reception waveform data in the storage unit 125a. Reception waveform data is generated by A/D converting the baseband signal.

Thereafter, the reception control unit 125 receives an instruction of reception waveform data from the sequence control unit 11. When the instruction is received, the reception control unit 125 reads reception waveform data stored in the storage unit 125a and outputs read reception waveform data to the combiner 13.

The sequence control unit 11 issues the instruction to start a test to the transmission control unit 121 and the reception control unit 125, and then issues an instruction to output reception waveform data to the reception control unit 125. Thus, in the test which is instructed to be started, reception waveform data is generated on the basis of the signal under test returning from the terminal 2 under test and output from the reception control unit 125 to the combiner 13. The sequence control unit 11 outputs the mode information D11 and corresponding to the setting information D12 instructed to be started to the combiner 13.

The combiner 13 receives reception waveform data from the reception control unit 125. The combiner 13 receives the mode information D11 and the setting information D12 from the sequence control unit 11. The combiner 13 attaches the mode information D11 and the setting information D12 to reception waveform data, and outputs reception waveform data to the signal analysis unit 32.

The signal analysis unit 32 includes a test data storage unit 32a, and when receiving reception waveform data from the combiner 13 (that is, the transceiver 1), stores reception waveform data in the test data storage unit 32a.

The signal analysis unit 32 specifies a communication system or a test item and a parameter designated as the test condition on the basis of the mode information D11 and the setting information D12 attached to reception waveform data. The signal analysis unit 32 analyzes reception waveform data on the basis of the communication system or the test item, and generates an output as the operator desires. The detailed operation of the signal analysis unit 32 at this time will be described in the section "configuration when analysis".

The sequence control unit 11 may be operated to add control information of the transmitting means 122 and the receiving means 124 (specifically, control parameters of hardware constituting the transmitting means 122 and the receiving means 124) to the setting information D12 and to output the setting information D12 to the combiner 13. Thus, it becomes possible for the signal analysis unit 32 to specify the control parameters on the basis of the setting information D12, making it possible to perform analysis on the basis of more detailed information.

Although in FIG. 1, the configuration has been described in which reception waveform data is transmitted from the combiner 13 to the signal analysis unit 32, the configuration is not limited insofar as reception waveform data output from the combiner 13 can be input to the signal analysis unit 32. For example, reception waveform data output from the combiner 13 may be stored in an external storage device, and the external storage device may be mounted in the signal analysis unit 32. In this case, the signal analysis unit 32 may read reception waveform data from the mounted external storage device and may perform analysis. The signal analysis unit 32 may be configured to store reception waveform data stored in the external storage device in the test data storage unit 32a, to read reception waveform data from the test data storage unit 32a, and to perform analysis.

(Configuration When Analysis)

Next, a configuration in which an operation is performed when waveform data of a signal under test received by the transceiver 1, that is, reception waveform data is analyzed by the signal analyzer 3 will be described.

The signal analysis unit 32 receives an instruction from the input/output I/F 4 and analyzes reception waveform data designated together. Specifically, when receiving an instruction to analyze reception waveform data from the input/output I/F 4, the signal analysis unit first reads reception waveform data instructed to be analyzed from the test data storage unit 32a.

Figure 3:
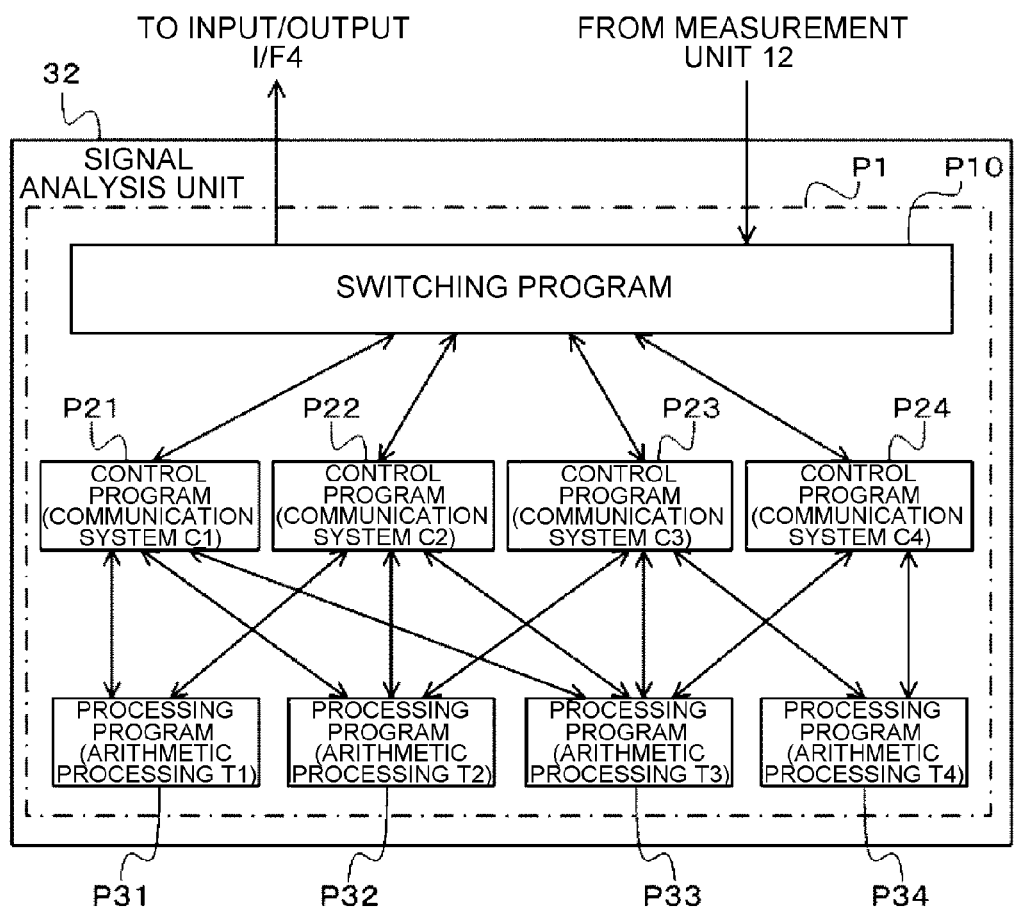
FIG. 3 is a diagram showing the configuration of an analysis program.

The signal analysis unit 32 is embedded with an analysis program P1 for analyzing reception waveform data. The signal analysis unit 32 executes the analysis program P1 with specified reception waveform data as input to analyze reception waveform data. The "configuration" and "processing flow" of the analysis program P1 will be described with reference to FIG. 3. FIG. 3 is a diagram showing the configuration of the analysis program P1. First, the "configuration" of the analysis program P1 will be described.

The analysis program P1 includes a switching program P10, control programs P21 to P24, and processing programs P31 to P34. The switching program P10 corresponds to a switching control unit of the invention. The control programs P21 to P24 correspond to control processing units of the invention. The processing programs P31 to P34 correspond to arithmetic processing units of the invention.

The control programs (P21 to P24) are provided for respective communication systems. For example, the control program P21 corresponds to a communication system C1, and in the control program P21, one or more arithmetic processings for carrying out a test defined by each test item of the communication system C1 are described as a set of processes in a predetermined sequence. A set of processes may be performed in terms of the test items, or the test items may be classified in advance and a set of processes may be performed in terms of the classifications. As an example of the classification, a plurality of test items where an arithmetic processing to be performed and the sequence in which the arithmetic processing is performed are identical and only the parameters of the arithmetic processings are different may be allocated to the same classification. Hereinafter, a set of processes having one or more arithmetic processings may be called an "analysis processing". As a specific example of the analysis processing, measurement of "ACLR (Adjacent Channel Leakage power Ratio)", "EVM (Error Vector Magnitude", "OBW (Occupied Band Width)", or the like, a frequency error, modulation analysis, or the like is advanced. The control programs (P21 to P24) are executed in accordance with a call from the switching program P10.

The above-described analysis processing includes an arithmetic processing, such as a "filter processing" or "FFT", which is common to a plurality of analysis processings. For this reason, the processing programs (P31 to P34) are provided for respective arithmetic processings. For example, the processing program P31 is a program for performing an arithmetic processing T1. Similarly, the processing program P32 corresponds to an arithmetic processing T2, the processing program P33 corresponds to an arithmetic processing T3, and the processing program P34 corresponds to an arithmetic processing T4. The processing programs (P31 to P34) are executed in accordance with a call from the control programs (P21 to P24).

Next, the "processing flow" of the analysis program P1, that is, a set of flows where the switching program P10, the control programs P21 to P24, and the processing programs P31 to P34 are executed will be described.

When the analysis program P1 is executed, first, the switching program P10 starts a process. The switching program P10 reads the mode information D11 attached to input reception waveform data, and specifies a communication system on the basis of the mode information D11. Hereinafter, description will be provided assuming that the communication system C1 is specified. The switching program P10 specifies the control program P21 corresponding to the specified communication system C1, and executes the control program P21 with reception waveform data as input.

The control program P21 reads the setting information D12 attached to input reception waveform data, and on the basis of information representing a test item in the setting information D12, specifies an analysis processing corresponding to the test item. The control program P21 reads information representing a parameter designated as the test condition from the setting information D12, and performs the specified analysis processing with the extracted information as input.

With regard to the analysis processing corresponding to the test item, one or more arithmetic processings are arranged in a predetermined sequence in advance. That is, the arithmetic processings constituting the analysis processing are performed in a predetermined sequence. Some of the arithmetic processings is constituted as the processing programs (P31 to P34) in advance, and the control program P21 calls a processing program corresponding to an arithmetic processing at the timing at which the arithmetic processing is performed. For example, with regard to an analysis processing corresponding to a test item, it is assumed that arithmetic processings T1, T2, and T3 are configured to be arranged in this sequence. In this case, the control program P21 calls the processing programs P31, P32, and P33 in this sequence to perform the arithmetic processings. For the parameter for performing each arithmetic processing, information extracted from the setting information D12, that is, the "parameter designated as the test condition" is used.

The control program P21 outputs the result of the performed analysis processing to the switching program P10. At this time, the control program P21 may convert the output format of the result of the analysis to a graph, a table, or the like in accordance with information representing the type of the performed analysis processing or the test item and may output the graph or table to the switching program P10. The switching program P10 outputs the result to the input/output I/F 4.

The input/output I/F 4 receives the performance result of the analysis processing by the analysis program P1 from the signal analysis unit 32, and displays the performance result on a display unit on the basis of a desired display mode. A display control unit which displays the performance result of the analysis processing in a desired display format may be provided.

As described above, the analysis program P1 is constituted in three layers of the switching program P10, control programs P21 to P24, and processing programs P31 to P34. The switching program P10, the control programs P21 to P24, and the processing programs P31 to P34 may be mounted in a distinguishable format (for example, functions) or may be mounted as separate libraries (files). A predetermined number of programs in each layer may form a set, and a library may be constituted for each set. The library is constituted as a library which can be dynamically linkable, like DLL (Dynamic Link Library), making it possible to reduce a work burden due to change or addition of the specification. Specifically, even when some content of the analysis processing is changed due to change in the standard, it becomes possible to address the change by substituting only an influential library. When adding a program corresponding to a new communication system, a control program corresponding to the new communication system and a processing program for performing a newly added arithmetic processing may be added, making it possible to address the addition without changing other control programs (P21 to P24).

Since the processing programs P31 to P34 are shared between the control programs P21 to P24, it is not necessary to embed each arithmetic processing as a program for each communication system. For this reason, it becomes possible to suppress the capacity of the entire analysis program P1. Even when a program is detected in some logic of the arithmetic processing, it should suffice that the processing program corresponding to the arithmetic processing is corrected, thereby facilitating maintenance of the program.

(Set of Operations when Transmission and Reception)

Figure 4:
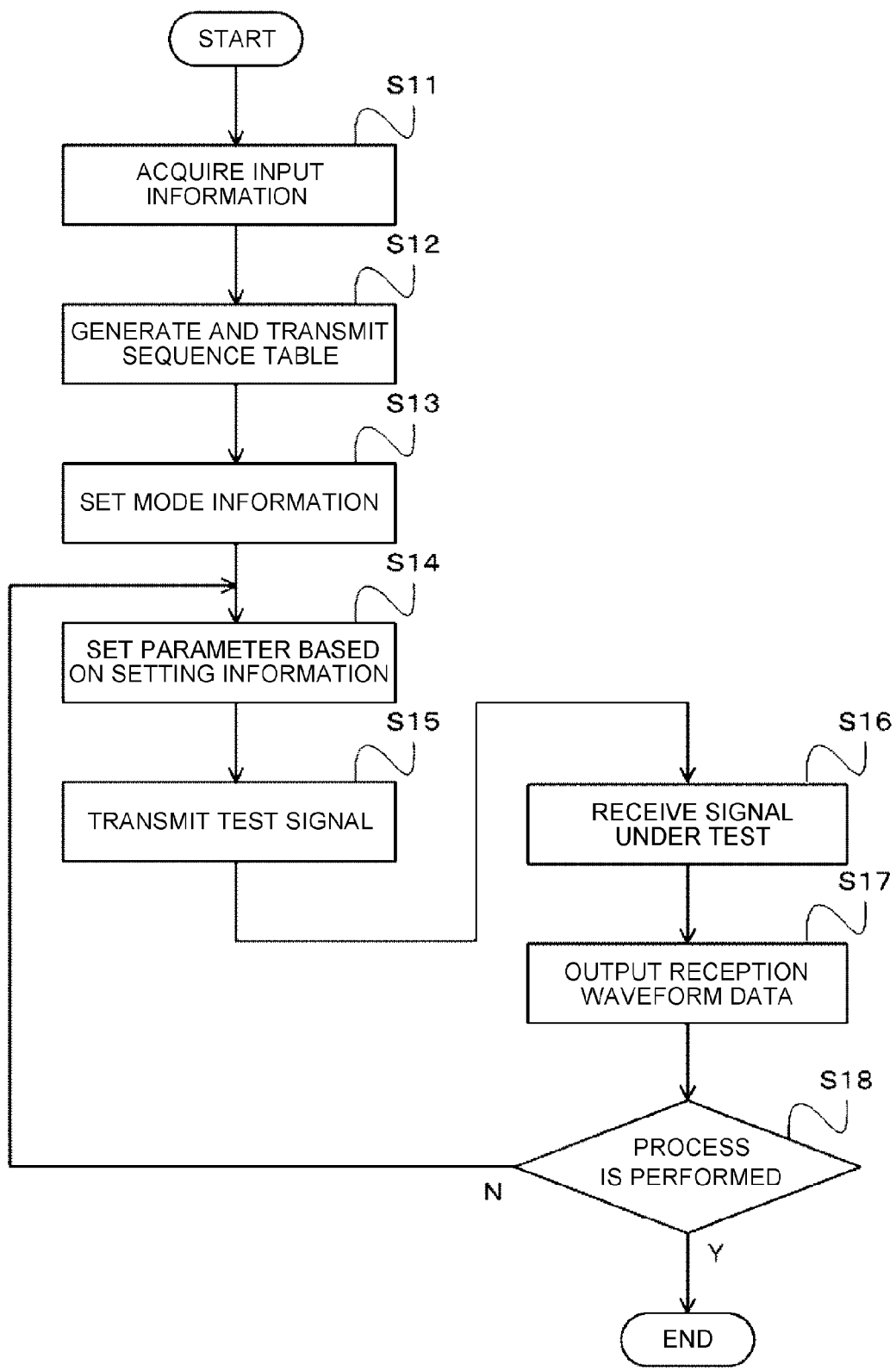
FIG. 4 is a flowchart showing the flow of a set of processes for transmitting and receiving a signal with respect to a terminal under test, and outputting reception waveform data.

Next, a set of operations to transmit and receive a signal with respect to the terminal 2 under test and to output reception waveform data will be described with reference to FIG. 4. FIG. 4 is a flowchart showing the flow of a set of processes for transmitting and receiving a signal with respect to a terminal under test, and outputting reception waveform data in a mobile communication terminal test system.

(Step S11)

The input information including a communication system designated by the operator, a test item to be carried out, and a parameter when each test is carried out is input to the input control unit 31 through the input/output I/F 4.

(Step S12)

The input control unit 31 creates the sequence table D1 on the basis of the input information received from the input/output I/F 4. The sequence table D1 includes the mode information D11 and one or more pieces of setting information D12. In the mode information D11, information representing the communication system designated as the input information is input. The setting information D12 is generated for each test item to be carried out. That is, when n test items are carried out, n pieces (setting information #1 to #n) of setting information D12 are generated. In each piece of setting information D12, information representing the test item and the parameters designated as the test conditions represented by the test item are input.

The input control unit 31 specifies corresponding transmission waveform data on the basis of the condition of the test signal (that is, DL) designated for each test item as the input information, and reads transmission waveform data from the waveform data storage unit 31a. The input control unit 31 inputs identification information for specifying read transmission waveform data to the setting information D12 of the test item associated with waveform data.

The input control unit 31 transmits the generated sequence table D1 to the sequence control unit 11 in association with one or more pieces of transmission waveform data read corresponding to the designated test item. When receiving the sequence table D1 and one or more pieces of transmission waveform data from the input control unit 31, the sequence control unit 11 stores these pieces of data in the storage unit 11a.

(Step S13)

Thereafter, when an instruction to start a test is issued from the input/output I/F 4, the input control unit 31 gives notification of the instruction to the sequence control unit 11. When the notification of the instruction is given, the sequence control unit 11 reads the mode information D11 from the sequence table D1 stored in the storage unit 11a, and outputs the read mode information D11 to the transmission control unit 121 and the reception control unit 125. Thus, it becomes possible for the measurement unit 12 to recognize the communication system designated as the input information and to transmit and receive a signal with respect to the terminal 2 under test on the basis of the communication system.

(Step S14)

Next, the sequence control unit 11 reads the setting information D12 from the sequence table D1 stored in the storage unit 11a, and extracts the identification information of transmission waveform data from the read setting information D12. The sequence control unit 11 specifies transmission waveform data corresponding to the test item represented by the setting information D12 from among one or more pieces of transmission waveform data stored in the storage unit 11a on the basis of the extracted identification information. The sequence control unit 11 outputs specified transmission waveform data to the transmission control unit 121. The transmission control unit 121 includes the storage unit 121a, and when receiving transmission waveform data from the sequence control unit 11, stores transmission waveform data in the storage unit 121a.

The sequence control unit 11 extracts the parameters designated as the test conditions from the setting information D12, and outputs a parameter relating to transmission of the test signal (DL) from among the parameters to the transmission control unit 121. The transmission control unit 121 receives the parameter relating to transmission of the test signal (DL) from the sequence control unit 11, and generates control information for controlling the operation of the transmitting means 122 on the basis of the parameter. The control information includes, for example, the frequency or output level of the test signal.

The sequence control unit 11 outputs a parameter relating to reception of the signal under test (UL) from among the extracted parameters to the reception control unit 125. The reception control unit 125 receives the parameter relating to reception of the signal under test (UL) from the sequence control unit 11, and generates control information for controlling the operation of the receiving means 124 on the basis of the parameter. The control information includes, for example, the frequency or input level of the signal under test.

(Step S15)

When the output of the parameters to the transmission control unit 121 and the reception control unit 125 is completed, the sequence control unit 11 issues an instruction to start a test to the transmission control unit 121 and the reception control unit 125. When the instruction to start a test is issued from the sequence control unit 11, the transmission control unit 121 outputs the generated control information and transmission waveform data stored in the storage unit 121a to the transmitting means 122, and causes the transmitting means 122 to generate the test signal.

The transmitting means 122 receives the control information and transmission waveform data from the transmission control unit 121. The transmitting means 122 generate a baseband signal on the basis of transmission waveform data, and modulates the generated baseband signal on the basis of the control information and the communication system designated by the mode information D11 to generate the test signal (RF signal). The transmitting means 122 transmits the generated test signal to the terminal 2 under test through the directional coupler 123.

(Step S16)

The receiving means 124 receives the control information from the reception control unit 125, and then receives the signal under test from the terminal 2 under test through the directional coupler 123. The receiving means 124 demodulates the received signal under test to a baseband signal on the basis of the control information and the communication system designated by the mode information D11. The receiving means 124 outputs the demodulated baseband signal to the reception control unit 125.

(Step S17)

The reception control unit 125 receives the baseband signal demodulated from the signal under test from the receiving means 124. The reception control unit 125 generates waveform data (that is, reception waveform data) of the baseband signal received from the receiving means 124, and stores generated reception waveform data in the storage unit 125a.

After the instruction to start a test is issued to the transmission control unit 121 and the reception control unit 125, the sequence control unit 11 issues an instruction to output reception waveform data to the reception control unit 125. Thus, in the test which is instructed to be started, reception waveform data generated on the basis of the signal under test returning from the terminal 2 under test is output from the reception control unit 125 to the combiner 13. The sequence control unit 11 outputs the mode information D11 and the setting information D12 corresponding to the test instructed to be started to the combiner 13.

The combiner 13 receives reception waveform data from the reception control unit 125. The combiner 13 receives the mode information D11 and the setting information D12 from the sequence control unit 11. The combiner 13 attaches the mode information D11 and the setting information D12 to reception waveform data, and outputs reception waveform data to the signal analysis unit 32.

(Step S18)

The sequence control unit 11 confirms whether or not a process is performed for all pieces of setting information D12 (#1 to #n) in the sequence table D1. When unprocessed setting information D12 remains (Step S18, N), the sequence control unit 11 reads subsequent setting information D12, and performs a set of processes for carrying out a test corresponding to the setting information D12. When a process is performed for all pieces of setting information D12 (#1 to #n) (Step S18, Y), the sequence control unit 11 ends a set of processes for acquiring reception waveform data.

(Set of Operations when Analysis)

Figure 5:
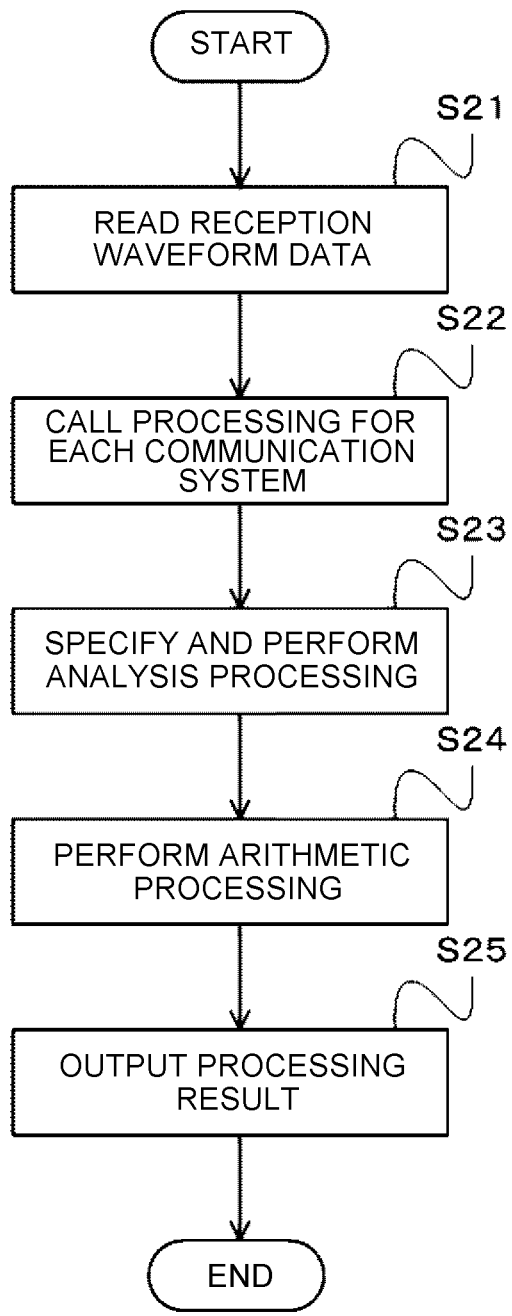
FIG. 5 is a flowchart showing the flow of a set of processes for analyzing reception waveform data.

Next, a set of operations to analyze reception waveform data will be described with reference to FIG. 5. FIG. 5 is a flowchart showing the flow of a set of processes for analyzing reception waveform data in a mobile communication terminal test system.

(Step S21)

When receiving an instruction to analyze reception waveform data from the input/output I/F 4, the signal analysis unit 32 first reads reception waveform data instructed to be analyzed from the test data storage unit 32a.

(Step S22)

The signal analysis unit 32 executes the analysis program P1 with specified reception waveform data as input. When the analysis program P1 is executed, first, the switching program P10 starts a process. The switching program P10 reads the mode information D11 attached to input reception waveform data, and specifies a communication system on the basis of the mode information D11. Hereinafter, description will be described assuming that the communication system C1 is specified. The switching program P10 specifies the control program P21 corresponding to the specified communication system C1, and executes the control program P21 with reception waveform data as input.

(Step S23)

The control program P21 reads the setting information D12 attached to input reception waveform data, and on the basis of information representing a test item in the setting information D12, specifies an analysis processing corresponding to the test item. The control program P21 extracts information representing a parameter designated as the test condition from the setting information D12, and performs the specified analysis processing with the extracted information as input.

(Step S24)

With regard to the analysis processing corresponding to test item, one or more arithmetic processings are arranged in a predetermined sequence in advance. That is, the arithmetic processings constituting the analysis processing are performed in a predetermined sequence. Some of the arithmetic processings is constituted as the processing programs (P31 to P34) in advance, and the control program P21 calls a processing program corresponding to the arithmetic processing at the timing at which the arithmetic processing is performed.

(Step S25)

The control program P21 outputs the result of the performed analysis processing to the switching program P10. At this time, the control program P21 may converts the output format of the result of the analysis processing to a graph, a table, or the like in accordance with information representing the type of the performed analysis processing or the test item and may output the graph or table to the switching program P10. The switching program P10 outputs the result to the input/output I/F 4.

The input/output I/F 4 receives the performance result of the analysis processing by the analysis program P1 from the signal analysis unit 32, and displays the performance result on the display unit on the basis of a desired display mode.

With the mobile communication terminal test system according to the invention, a process for analyzing waveform data can be performed by the signal analyzer 3 which is provided separately from the transceiver 1. Therefore, even when a new test item is added, it becomes possible to substitute a program (that is, the analysis program P1) of the signal analyzer 3 without substituting the transceiver 1.

The analysis program P1 is constituted in three layers of the switching program P10, the control programs P21 to P24, and the processing programs P31 to P34. For this reason, a predetermined number of programs in each layer may form a set, and a library may be constituted for each set, such that, even when some content of the analysis processing is changed due to change in the standard, it becomes possible to address the change by substituting only an influential library. When adding a program corresponding to a new communication system, a control program corresponding to the new communication system and a processing program for performing a newly added arithmetic processing may be added, making it possible to address the addition without changing other control programs (P21 to P24).

Reception waveform data is attached with "information representing a communication system", "information representing a test item", and "information representing parameters designated as the test conditions", and is then stored in the test data storage unit 32a. For this reason, it becomes possible for the signal analysis unit 32 to specify the communication system or the test item, and the condition of the designated test on the basis of the attached information, and to perform an analysis processing. Therefore, it becomes possible for the signal analysis unit 32 to perform an analysis processing separately from a process for acquiring reception waveform data by the transceiver 1.

DESCRIPTION OF REFERENCE NUMERALS AND SIGNS

1: transceiver
11: sequence control unit
12: measurement unit
121: transmission control unit
122: transmitting means
123: directional coupler
124: receiving means
125: reception control unit
13: combiner
2: terminal under test
3: signal analyzer
31: input control unit
32: signal analysis unit
4: input/output I/F

The invention claimed is:

1. A mobile communication terminal test system comprising:
a transceiver, including a measurement unit which transmits and receives a signal with respect to a terminal under test and acquires waveform data of a received signal, and a control unit which controls the measurement unit in accordance with a designated communication system and a test item, and appends input information for identifying the communication system and the test item to the waveform data; and
a signal analyzer which includes a signal analysis unit configured to analyze the waveform data received from the transceiver, and is provided separately from the transceiver,
wherein the signal analysis unit includes
arithmetic processing units which are provided for respective types of arithmetic processings so as to perform a plurality of types of arithmetic processings on the waveform data,
control processing units which are provided for respective communication systems, select one or more arithmetic processing units so as to output desired analysis data for each test item, and allow the arithmetic processing units to perform the arithmetic processings in association as a set of processes in a predetermined sequence, and
a switching unit which specifies the communication system and the test item on the basis of the input information appended to the waveform data, and selects a control processing unit in accordance with the specified communication system and the specified test item, and the control processing unit is selected by the switching unit in accordance with the specified communication system, and when the control processing unit is selected, the arithmetic processing unit performs the processes in accordance with the specified test item.

2. The mobile communication terminal test system according to claim 1,
wherein the signal analysis unit is configured so that one or both of the arithmetic processing units and the control processing units can be added or deleted.

3. A method of analyzing waveform data by a transceiver (1) and a signal analyzer,
wherein the transceiver includes a measurement unit which transmits and receives a signal with respect to a terminal under test and acquires waveform data of a received signal, and a control unit which controls the measurement unit in accordance with a designated communication system and a test item, and appends input information for identifying the communication system and the test item to the waveform data, and
the signal analyzer includes a signal analysis unit which executes an analysis program for analyzing the waveform data to analyze the waveform data received from the transceiver,
the method comprising:
a preparation step of preparing, as the analysis program,
processing programs which are provided for respective types of arithmetic processings so as to perform a plurality of types of arithmetic processings on the waveform data,
control programs which are provided for respective communication systems, select a processing program, which performs one or more arithmetic processings so as to output desired analysis data for each test item, and allow the processing program to perform the arithmetic processings in association as a set of processes in a predetermined sequence, and
a switching program which specifies the communication system and the test item on the basis of the input information appended to the waveform data;
a condition specification step of specifying the communication system and the test item on the basis of the input information appended to the waveform data;
a switching step in which a control program corresponding to the communication system is executed in accordance with the specified communication system; and
an arithmetic execution step in which a control program is selected for each step of each arithmetic processing associated with the specified test item and the arithmetic processing is performed.

4. An analysis program which causes a computer to analyze waveform data measured through transmission/reception of a signal with respect to a terminal under test and appended with input information for identifying a designated communication system and a test item,
wherein the analysis program has
processing functions for respective types of arithmetic processings so as to perform a plurality of types of arithmetic processings on the waveform data,
control functions which are provided for respective communication systems, and execute one or more processing functions in association as a set of processes in a predetermined sequence so as to output desired analysis data for each test item, and a specification function which specifies the communication system and the test item on the basis of the input information appended to the waveform data, and executes the control function in accordance with the specified communication system, and
when the control function is executed, the processing function is executed in accordance with the specified test item.

* * * * *